US009605326B2

(12) United States Patent
Martinez-Contreras

(10) Patent No.: US 9,605,326 B2
(45) Date of Patent: Mar. 28, 2017

(54) METHOD AND SYSTEM FOR OPERATING A BLAST FURNACE WITH TOP-GAS RECYCLE AND A FIRED TUBULAR HEATER

(71) Applicant: HYL TECHNOLOGIES, S.A. DE C.V., San Nicholás de los Garza (MX)

(72) Inventor: Jose Juan Martinez-Contreras, Nuevo Leon (MX)

(73) Assignee: HYL TECHNOLOGIES, S.A. DE C.V., San Nicolas De Los Garza, N.L. (MX)

( * ) Notice: Subject to any disclaimer, the term of this patent is extended or adjusted under 35 U.S.C. 154(b) by 194 days.

(21) Appl. No.: 14/412,071

(22) PCT Filed: Jul. 3, 2013

(86) PCT No.: PCT/IB2013/001974
§ 371 (c)(1),
(2) Date: Dec. 30, 2014

(87) PCT Pub. No.: WO2014/006511
PCT Pub. Date: Jan. 9, 2014

(65) Prior Publication Data
US 2015/0135900 A1 May 21, 2015

Related U.S. Application Data

(60) Provisional application No. 61/667,896, filed on Jul. 3, 2012.

(51) Int. Cl.
*C21B 5/06* (2006.01)
*C21B 7/00* (2006.01)
(Continued)

(52) U.S. Cl.
CPC ............... *C21B 5/06* (2013.01); *C10K 1/005* (2013.01); *C10K 1/02* (2013.01); *C10K 1/04* (2013.01);
(Continued)

(58) Field of Classification Search
CPC .. C21B 5/06; C21B 7/002; C21B 7/22; C10K 1/005; C10K 1/02; C10K 1/04; F27D 17/002; F27D 17/004
See application file for complete search history.

(56) References Cited

U.S. PATENT DOCUMENTS 3,784,370 A 1/1974 Stephenson, Jr.
4,363,654 A 12/1982 Frederick et al.
(Continued)

FOREIGN PATENT DOCUMENTS

DE 37 02 875 C1 4/1988
FR 2 049 293 3/1971
(Continued)

OTHER PUBLICATIONS

Danloy G. et al: "ULCOS—Pilot testing of the low-CO2 blast furnace process at the experimental BF in Luleaa", Revue De Metallurgie—Cahiers D'Informations Techniques, Revue De Metallurgie. Paris, FR, vol. 106, No. 1, Jan. 1, 2009 (Jan. 1, 2009), pp. 1-8, XP001521800, ISSN: 0035-1563, DOI: 10.1051/METAL/2009008 figure1.
(Continued)

*Primary Examiner* — George Wyszomierski
*Assistant Examiner* — Tima M McGuthry Banks
(74) *Attorney, Agent, or Firm* — Frommer Lawrence & Haug LLP; A. Thomas S. Safford

(57) ABSTRACT

A blast furnace system is used wherein the coke rate is decreased by recycling upgraded top gas from the furnace back into its shaft section (which upgraded top gas is heated
(Continued)

in a tubular heater prior to being recycled). The top gas, comprising CO, $CO_2$ and $H_2$, is withdrawn from the upper part of the blast furnace; cooled and cleaned of dust, water, and $CO_2$ for increasing its reduction potential and is heated to a temperature above 850° C. before being recycled thus defining a first gas flow path used during normal operation of the blast furnace. Uniquely, a second gas flow path for continued circulation of top gas selectively through the heater and a cooler during operation interruptions of the blast furnace allows time for gradual controlled cool down of the heater in a manner to avoid heat-shock damage to the tubular heater.

11 Claims, 1 Drawing Sheet

(51) Int. Cl.
| | | |
|---|---|---|
| *C21B 7/22* | (2006.01) | |
| *C10K 1/00* | (2006.01) | |
| *C10K 1/02* | (2006.01) | |
| *C10K 1/04* | (2006.01) | |
| *F27D 17/00* | (2006.01) | |
| *F27B 1/22* | (2006.01) | |
| *F27B 1/24* | (2006.01) | |
| *C21D 1/52* | (2006.01) | |
| *C21D 1/34* | (2006.01) | |

(52) U.S. Cl.
CPC ............ *C21B 7/002* (2013.01); *C21B 7/22* (2013.01); *C21D 1/52* (2013.01); *F27B 1/22* (2013.01); *F27B 1/24* (2013.01); *F27D 17/002* (2013.01); *F27D 17/004* (2013.01); *F27D 17/008* (2013.01); *C21D 1/34* (2013.01); *F27D 2017/006* (2013.01); *Y02P 10/122* (2015.11); *Y02P 10/126* (2015.11); *Y02P 10/212* (2015.11); *Y02P 10/283* (2015.11)

(56) References Cited

U.S. PATENT DOCUMENTS

| | | |
|---|---|---|
| 4,844,737 A | 7/1989 | Oono et al. |
| 4,917,727 A | 4/1990 | Saito et al. |
| 5,234,490 A | 8/1993 | Kundrat |
| 2003/0047037 A1* | 3/2003 | Sethna ............... B01D 53/047 75/505 |
| 2010/0212457 A1* | 8/2010 | Drnevich ............... C01B 3/061 75/414 |
| 2012/0090515 A1 | 4/2012 | Didelon et al. |
| 2013/0312571 A1* | 11/2013 | Metius ................... C21B 13/02 75/488 |
| 2015/0068364 A1* | 3/2015 | Garza-Davila ........... C21B 5/00 75/468 |

FOREIGN PATENT DOCUMENTS

| | | | |
|---|---|---|---|
| GB | 1218912 | 1/1971 | |
| JP | 55-113814 | 9/1980 | |
| JP | EP 2543743 A1 * | 1/2013 | ............... C21B 5/06 |

OTHER PUBLICATIONS

International Search Report issued in corresponding International Application No. PCT/IB2013-001974 mailed Feb. 25, 2014.

* cited by examiner

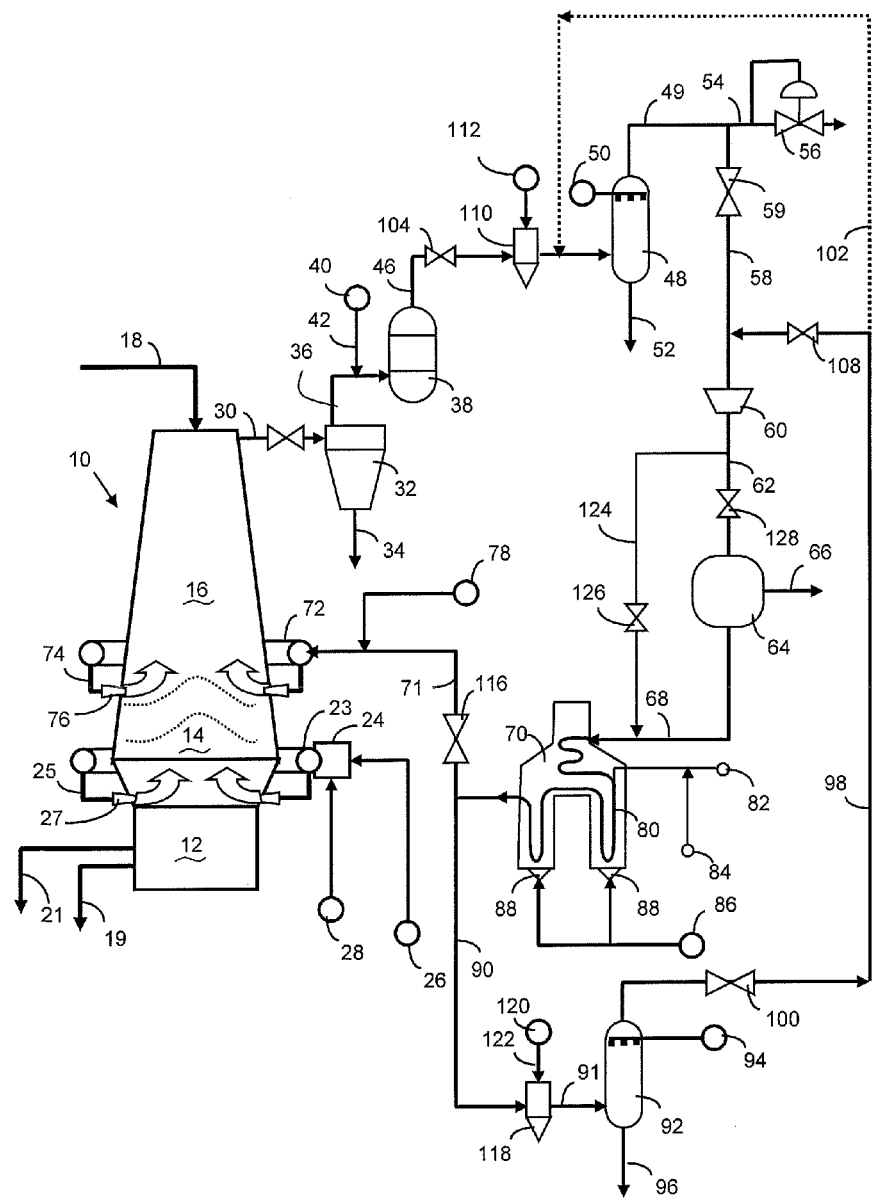

METHOD AND SYSTEM FOR OPERATING A BLAST FURNACE WITH TOP-GAS RECYCLE AND A FIRED TUBULAR HEATER

This application is a National Stage Entry under 35 U.S.C. §371 of PCT/IB2013/001974 filed on Jul. 3, 2013, published on Jan. 9, 2014 under publication number WO 2014/006511, which claims the priority benefit of U.S Provisional Application No. 61/667,896 filed Jul. 3, 2012, the disclosures of which are incorporated by reference herein in their entirety.

FIELD OF THE INVENTION

The invention relates to the field of the iron and steel industry, more particularly to the operation of blast furnaces comprising upgraded top gas recycle through a direct fired gas heater for increasing the efficiency and productivity of the blast furnace while protecting said heater from thermal shocks when the blast furnace system starts its operation or when the top gas recycle to the blast furnace has to be interrupted.

BACKGROUND OF THE INVENTION

In a blast furnace producing pig iron, iron ore is charged together with coke and fluxes through the upper part of the furnace. A hot air blast is injected through tuyeres at the bottom of the furnace, thereby generating heat by the combustion of the carbon of coke which melts down the charge. The controlled combustion of coke also generates hydrogen and carbon monoxide which chemically reduce the iron oxides in the furnace. Periodically liquid iron and slag are tapped from the furnace. The combustion gases flow up through the furnace and reduce the iron oxides, and exit the furnace as a stream of dust-laden hot gas. Heat is recovered for preheating the air blast, and this furnace top gas, once cooled down, is then normally used as fuel in other areas of the steel plant.

Metallurgical coke is needed in the charge of a blast furnace because this material (produced by pyrolysis, e.g. indirect heating without oxygen presence, of coal in coke ovens) provides the structural support of the charge of the furnace above the so-called "dead man" zone where the metallic iron starts melting and falling down to the bottom part of the furnace where molten iron and slag are collected.

Coke also provides the heat for melting the iron charge by its combustion with an oxygen-containing gas, typically preheated air, the combustion gases, mainly composed of CO and $CO_2$ with some $H_2$ and water, flow upwardly through the shaft portion of the furnace and reduce the iron oxides to wustite (FeO).

Several proposals for recycling top gas in a blast furnace with the aim of reducing the coke rate, are found in the prior art, addressed to recycling top gas to the furnace and in this way decrease the coke consumption to a minimum. If the top gas is heated in a direct fired tubular heater, the tubes of the heater made of high-grade alloys to withstand the high temperatures necessary to raise the temperature of the top gas above, 850° C., preferably in the range of 900° C. to 1100° C., need to follow a specific scheduled temperature profile during start-up and shut-down periods, to avoid thermal shock to the tubes, which requires a continuous flow of the gas through the tubes of the heater during such start-up and shut-down.

Applicants have found several patents and patent applications concerning top gas recycle to a blast furnace for reducing coke consumption, teaching that the recycled gas is to be heated to temperatures suitable for direct reduction of iron oxides, for example: U.S. Pat. Nos. 3,784,370; 4,844,737; 4,917,727; 4,363,654; 5,234,490; U.S. Patent application No. 2010/0212457 A1; British Patent No. GB1,218,912; and Japanese Patent Publication No. JP55113814.

None of the above patents or patent applications teach or suggest providing an alternative path comprising cooling means for the hot gas effluent from the gas heater for protecting said gas heater components from thermal shocks due to unforeseen operation interruptions of the blast furnace. Solutions for this practical problem of the heaters for improving the operation and availability of blast furnaces with upgraded top gas recycle are not envisioned in the prior art.

OBJECTS OF THE INVENTION

It is an object of the invention to provide a method and apparatus for improving the operation of a blast furnace by upgrading and recycling top gas.

It is another object of the invention to provide a method and apparatus for improving the operation of a blast furnace by providing a hot gas alternative circuit including gas cooling means allowing for applying a start-up and shut-down normal operation of the heater, even if the rest of the BF plant operation stops.

It is a further object of the invention to provide a method and apparatus for improving the availability of a blast furnace plant by providing a gas circuit and cooling means allowing for an independent operation procedure.

Other objects of the invention will be evident for those skilled in the art or will be pointed out in the description of the invention.

SUMMARY OF THE INVENTION

The objects of the invention are generally achieved by providing a method of producing iron in a blast furnace wherein the coke rate is decreased by recycling upgraded top gas which is heated in a tubular heater prior to its recycling to the blast furnace and wherein said tubular heater is protected from damages that may be caused by unforeseen operation interruptions of the blast furnace system, and wherein a top gas stream comprising CO, $CO_2$ and $H_2$, is withdrawn from the upper part of the blast furnace, is cleaned of dust and water and $CO_2$ are removed from said cooled top gas stream for increasing its reduction potential and is heated to a temperature above 850° C., preferably between 900° C. and 1100° C., before being recycled to the blast furnace through a first gas flow path used during normal operation of the blast furnace system. A second gas flow path for circulation of the top gas through said heater is provided so that in case of operation interruptions of the blast furnace system, the top gas continues circulating through said second gas flow path thus avoiding damage to said tubular heater by sudden thermal changes that might be caused by said operation interruptions of the blast furnace system.

The objects of the invention are also achieved by providing a blast furnace system for producing molten iron in a blast furnace to which iron ore, metallurgical coke and fluxes are charged at its upper part and molten iron and slag are tapped from its lower part, comprising means for cleaning the top gas stream of dust connected to said outlet means; first cooling means for washing and cooling said top gas stream and removing water therefrom; pump means for increasing the pressure of the cooled top gas stream to enable recycling of said top gas to the blast furnace; means for removing $CO_2$ from at least a portion of said cooled top gas stream forming a $CO_2$-lean reducing gas stream, a tubular gas heater for heating said $CO_2$-lean reducing gas stream to a temperature above 850° C., and first piping means connecting the components of said blast furnace system defining a first gas circulation gas path through said gas heater to recycle said hot reducing gas stream to said blast furnace during normal operation of the blast furnace system; characterized by further comprising: second cooling means for cooling hot gas effluent from said heater; second piping means connecting said second cooling means with said gas heater and said pump means defining a second path for gas circulation through said gas heater; first valve means for selectively diverting the flow of gas effluent from said heater to said second cooling means and to flow through said second gas path; and second valve means for blocking the flow of gas effluent from said heater to said blast furnace when the gas effluent from said reactor is flowing through said second gas path; whereby in case the operation of the blast furnace system is interrupted, the gas circulating through the heater is diverted through said second gas path to prevent damage of said heater from sudden thermal changes caused by said blast furnace system operation interruption.

The objects of the invention are also achieved in its broader aspects by providing a method of producing molten iron in a blast furnace wherein iron ore, metallurgical coke and fluxes are charged at its upper part and molten iron and slag are tapped from its lower part, said blast furnace having a plurality of tuyeres in its lower part through which an oxygen-containing gas is introduced for generating heat and reducing gases by combustion of the coke within said furnace further comprising forming during normal operation a first gas circulation path by withdrawing a stream of hot top gas from said blast furnace; cooling and washing the hot top gas stream of dust in first cooling means; increasing the pressure of the resulting cooled top gas stream by pump means to enable recycling of said top gas stream back to the blast furnace; removing CO2 from at least a portion of said cooled top gas stream forming a CO2-lean reducing gas stream; heating in a tubular gas heater said CO2-lean reducing gas stream to a temperature above 850° C.; completing the first gas circulation path by causing the resulting now-hot CO2-lean reducing gas stream to be injected back into the upper part of said blast furnace; further characterized by protecting the heater during interruption of operation of the blast furnace, with the consequent interruption in the normal flow of top gas therefrom, by forming a second gas circulation path to assure continuous gas flow of CO2-lean reducing gas through the heater during controlled heater cool-down by diverting the flow of hot gas effluent from said heater away from said blast furnace and through a cooling means; passing the resulting cooled gas effluent on through said pump means to pressurize and maintain gas flow through said second gas path; and completing the second gas circulation path by re-circulating the cooled and pressurized gas effluent back into said heater.

BRIEF DESCRIPTION OF THE DRAWINGS

FIG. 1 is a schematic process diagram showing a preferred embodiment of the invention.

DETAILED DESCRIPTION OF THE INVENTION

Referring to FIG. 1, numeral 10 generally designates a blast furnace having in its lower part a crucible section 12 where molten iron and slag are collected and above that a blast section 14 where the oxygen containing gases are introduced for carrying out the combustion of coke, and in its upper part a shaft section 16 where iron ore particles in the form of sinter, pellets or lumps and mixtures thereof are charged along with coke, limestone and other fluxes 18, and next the iron oxides are reduced to wustite and finally to metallic iron as is known in the art. Molten iron 19 and slag 21 are periodically tapped from the bottom zone 12 of blast furnace 10.

Oxygen from a source 26 of industrial purity, instead of air, is fed to mixing device 24 where a temperature moderating agent is fed from a source 28 for preventing the flame temperatures from reaching excessively high levels and therefore from damaging the blast nozzles in tuyeres 27. The temperature moderating agents 28 may be for example, steam, carbon dioxide, oil, pulverized coal, coke fines or other hydrocarbon that will undergo an endothermic reaction with the oxygen and lower the temperatures to levels of about 2000° C. to 2600° C. Also a portion of the top gas from pipe 30 after treatment can be recycled to the tuyeres for moderating the high combustion temperature of oxygen with coke. Oxygen blast 26 combined with the moderating agent 28 are fed to header 23 and then through feeding pipes 25 to tuyeres 27.

The top gas composition varies in a wide range depending on the characteristics of the materials charged to the blast furnace. A typical composition on a dry basis is 25% CO, 12% $CO_2$; 5% $H_2$ and 56% $N_2$ and traces of other gases. The top gas effluent from the top of the blast furnace 10 exits through pipe 30 and is fed to a de-dusting device 32, where dusts from the charge and soot or other solid materials 34 are separated.

In an optional preferred embodiment of the invention, the resulting cleaned gas flows through pipe 36 to shift reactor 38 where the composition of the cleaned and cooled gas is adjusted to increase the hydrogen content so as to obtain a $H_2/CO$ ratio of 1.5 to 4, preferably between 2 and 3 (measured by % volume). Steam 40 is supplied as the reactant for the shift reaction through pipe 42. The CO reacts with $H_2O$ to form $H_2$ according to the reaction:

$$CO + H_2O \rightarrow H_2 + CO_2$$

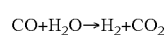

The temperature to carry out the above reaction is above about 300° C. The top gas stream may be heated by means known in the art as a heat exchanger (not shown) before being fed to shift reactor 38. The shifted gas is then passed through pipe 46 and valve 104 to cooling water injection device 110, where the temperature of the gas is lowered by contact with water 112, and then is passed on to a first cooler/scrubber 48 (using cooling water 50) where the water content of the gas is condensed and combined waters are extracted as water stream 52. In the illustrated preferred embodiment, the device 110 and cooler/scrubber 48 may also together be considered to function as the first cooler means.

The de-watered gas then flows through pipe 49 from where a minor portion of the cleaned and dewatered gas 54 is purged from the recycle circuit through pipe having a pressure control valve 56 (for pressure control of, and for maintaining a $N_2$ concentration below 13% by volume, in the recycle circuit). A majority of the gas stream flows through pipe 58 to be recycled to the blast furnace 10. The purged gas 54 may be advantageously utilized as fuel in burners 88 for the gas heater 70 and optionally if needed may also be supplemented with other fuel as for example coke oven gas or natural gas 86.

The cleaned and dewatered reducing effluent gas is then transferred to compressor 60 through pipe 58 wherein its pressure is raised by this pump means 60 to a level suitable for further treatment prior to its ultimate recycling to blast furnace 10. In order to upgrade the reducing potential of the recycled reducing gas, the pressurized effluent gas flows through pipe 62 to a $CO_2$ separation unit 64 where $CO_2$ 66 is removed, leaving a reducing gas mainly composed of CO and $H_2$.

Removal of $CO_2$ from the cooled gas stream being recycled may be carried out by absorption using an amines solution or carbonates solution or by physical adsorption in a pressure swing adsorption (PSA) or vacuum pressure swing adsorption (VPSA) unit.

The $CO_2$ lean gas is led through pipe 68 to heater 70 where its temperature is raised above 800° C. The resulting hot reducing gas is led through pipe 71 to header 72, and this recycled reducing gas is introduced into the shaft part 16 of the blast furnace through peripheral pipes 74 and nozzles 76. Oxygen from source 78 may be added to the hot reducing gas for further increasing the temperature of the reducing gas to between 1000° and 1100° C. A suitable fuel 86, for example natural gas or coke oven gas, is used in burners 88 of heater 70.

Upgraded recycled top gas with an improved H2/CO ratio and high reduction potential (measured as the ratio of $H_2+CO/CO_2+H_2O$ and having a value above 2), is heated in coils 80 of the heater 70 to a temperature above 800° C. for reducing the iron oxides in the shaft section 16. A mixture of steam 82 and air/oxygen 84 may be periodically injected to the tubes 80 of the heater 70 for decoking, e.g. eliminating carbon deposits that may accumulate in the tubes 80, depending on the composition of the top gas.

Tubular heaters typically have a series of heating tubes 80 made of special alloys to withstand the high wall temperatures and require specific and detailed start-up and shut-down procedures in order to avoid thermal shocks to said tubes 80, which may be damaged if sudden temperature changes happen. The damages caused by sudden temperature changes produce cracks in the outer part of the tubes walls due to the different temperatures that the tubes walls have on the outer and inner surfaces and alloy fatigue.

The normal procedure for shutting down a gas heater is to start cooling the furnace from the normal working temperature which is about 900° C. in a programmed cooling rate for example of about 30° C. per hour. This gradual cooling is done while maintaining the normal flow of gas through the tubes.

When the temperature of the gas at the outlet of the heater is between about 600° C. and 700° C., the fuel gas flow to the burners 88 is gradually lowered and the tubes 80 are then allowed to cool down slowly. In this way the useful life of the tubes is longer than if the tubes suffer thermal fatigue for unexpected interruptions of the gas flow through said tubes.

In order to avoid damages to the heater tubes, the top gas flow effluent from heater 70 is diverted to pipe 90 by closing valve 116 to pipe 90 and then to water injection device 118 where the hot top gas is quenched by contact with water from source 120 through pipe 122. The quenched top gas flows through pipe 91 to a second cooler/scrubber 92 where the top gas is washed and cooled down by direct contact with water from source 94, which exits through pipe 96. The cool and clean top gas passes through pipe 98 and valves 100 and 108 and is fed to compressor 60 thus maintaining a flow of top gas through the tubes 80 of heater 70 even if the operation of blast furnace 10 is interrupted.

In another embodiment of the invention, cooler/scrubber 92 may be dispensed with and instead the quenched top gas from pipe 90/98 is washed and cooled down in cooler/scrubber 48 by closing valve 108 and causing it to flow through pipe 102 (shown in dotted line to indicate an optional embodiment of the invention) to washer/scrubber 48, cooled and clean top gas effluent from cooler/scrubber 48 then flows through pipe 58 by opening valve 59 and closing valve 104.

Preferably also, the heater can be further protected, if there is an operating problem at the $CO_2$ removal unit, by providing a by-pass of the $CO_2$ removal unit using pipe 124 and isolation valves 126 and valve 128.

A further preferred embodiment includes the option of having both first and second coolers 92 & 48. For example, in an embodiment, not including the shifter, the top gas will come out of the de-dusting device 32 at around 100-120° C., therefore the first cooler 48 will be designed for a low cooling capacity, while if a shifter is included, then the top gas will be at about 300° C. and then said first cooler 48 will be designed for a higher cooling capacity. In any case, the second cooler 92 will be designed for cooling top gas at much higher temperatures because the top gas will be exiting the heater at about 850 to 1000° C. and therefore, second cooler 92 is more important than the first cooler.

The present invention may be applied to either new or existing furnaces wherein top gas is recycled and when said recycled top gas is heated in a direct fired tubular heater.

It is of course to be understood that in this specification only some preferred embodiments of the invention have been described for illustration purposes and that the scope of the invention is not limited by such described embodiments but only by the scope of the appended claims.

What is claimed is:

1. Method of producing molten iron in a blast furnace wherein iron ore, metallurgical coke and fluxes are charged at its upper part and molten iron and slag are tapped from its lower part, said blast furnace having a plurality of tuyeres in its lower part through which an oxygen-containing gas is introduced for generating heat and reducing gases by combustion of the coke within said furnace, further comprising forming during normal operation a first gas circulation path by:
withdrawing a stream of hot top gas comprising CO, $CO_2$, and $H_2$ from said blast furnace;
cooling and washing the hot top gas stream including dust removal in first cooling means;
increasing the pressure of the resulting cooled top gas stream by pump means to enable recycling of said top gas stream back to the blast furnace;
removing $CO_2$ from at least a portion of said cooled top gas stream forming a $CO_2$-lean reducing gas stream;
heating in a tubular gas heater said $CO_2$-lean reducing gas stream to a temperature above 850° C.;
completing the first gas circulation path by causing the resulting now-hot $CO_2$-lean reducing gas stream to be injected back into the upper part of said blast furnace;

further characterized by:
protecting the heater during interruption of operation of the blast furnace, with the consequent interruption in flow of the top gas stream therefrom, by forming a second gas circulation path to assure continuous gas flow of $CO_2$-lean reducing gas through the heater during controlled heater cool-down by:

diverting the flow of the heated $CO_2$-lean reducing gas stream from said heater away from said blast furnace and through a cooling means passing the resulting cooled $CO_2$-lean reducing gas stream on through said pump means to pressurize and maintain gas flow through said second gas path; and completing the second gas circulation path by re-circulating the cooled and pressurized gas effluent continuously back into said heater as needed during cool-down.

2. Method according to claim 1, further characterized by the cooling means in the second gas circulation path being the same cooling means as in the first gas circulation path.

3. Method according to claim 1, further characterized by the cooling means in the second gas circulation path being a second separate cooling means.

4. Method according to claim 1, further characterized by the cooling means in the second gas circulation path includes both the same cooling means as in the first gas circulation path and a second separate cooling means.

5. Method according to claim 1, further characterized by reacting said top gas stream after dust removal in a catalytic reactor with steam at a temperature above 300° C. for increasing the volume ratio of $H_2/CO$ of said top gas.

6. Method according to claim 1, further characterized by removing $CO_2$ from said cooled top gas stream by absorption of the $CO_2$ in an amine solution.

7. Method according to claim 1, further characterized by removing $CO_2$ from said cooled top gas stream by adsorption of the $CO_2$ in a Pressure Swing Adsorption unit.

8. A blast furnace system for producing molten iron in a blast furnace to which iron ore, metallurgical coke and fluxes are charged at its upper part and molten iron and slag are tapped from its lower part, said blast furnace having a plurality of tuyeres in its lower part for introducing an oxygen-containing gas for generating heat and reducing gases by combustion of the coke within said furnace, resulting in a top gas stream comprising CO, $CO_2$, and $H_2$ from said upper part of said blast furnace;

having:

first cooling means for washing and cooling said top gas stream and removing dust and water therefrom being connected to receive a hot top gas stream from the upper part of said blast furnace;

pump means for increasing the pressure of the resulting cooled top gas stream to enable recycling of said top gas to the blast furnace;

means for removing $CO_2$ from at least a portion of said cooled top gas stream forming a $CO_2$-lean reducing gas stream, a tubular gas heater for heating said $CO_2$-lean reducing gas stream to a temperature above 850° C., and first piping means connecting the first cooling means, the pump means, the means for removing $CO_2$, and the heater, to the blast furnace to form a first gas circulation gas path through said gas heater to recycle the heated $CO_2$-lean reducing gas stream to said blast furnace during normal operation of the blast furnace system;

characterized by comprising;

second cooling means for cooling hot gas effluent diverted thereto from said heater;

second piping means connecting said second cooling means with said gas heater and said pump means defining a second path for gas circulation through said gas heater;

first valve means for selectively diverting the flow of gas effluent from said heater to said second cooling means and to flow through said second gas path; and second valve means for blocking the flow of gas effluent from said heater to said blast furnace when the gas effluent from said reactor is flowing through said second gas path;

whereby in case that the operation of the blast furnace system is interrupted, the gas that was circulating through the heater is capable of being diverted to flow through said second gas path and to continue flowing through said heater to prevent damage of said heater from sudden thermal changes caused by said blast furnace system operation interruption.

9. A blast furnace system according to claim 8, further characterized by comprising means for adjusting the volume ratio of $H_2/CO$ of said top gas in a catalytic reactor.

10. A blast furnace system according to claim 8, further characterized by said means fir removing $CO_2$ is an absorption column utilizing an amine solution.

11. A blast furnace system according to claim 8, further characterized by said means for removing $CO_2$ is a Pressure Swing Adsorption (PSA) or Vacuum Pressure Swing Adsorption (VPSA) adsorption unit.

* * * * *